United States Patent
Moon et al.

(10) Patent No.: US 6,597,418 B2
(45) Date of Patent: Jul. 22, 2003

(54) TRANSPARENT REFLECTIVE LIQUID CRYSTAL DISPLAY

(75) Inventors: Jong Weon Moon, Seoul (KR); Yong Beom Kim, Kyunggi-do (KR)

(73) Assignee: LG. Philips LCD Co., Ltd., Seoul (KR)

(*) Notice: Subject to any disclaimer, the term of this patent is extended or adjusted under 35 U.S.C. 154(b) by 0 days.

(21) Appl. No.: 09/878,914

(22) Filed: Jun. 13, 2001

(65) Prior Publication Data

US 2002/0089623 A1 Jul. 11, 2002

(Under 37 CFR 1.47)

(30) Foreign Application Priority Data

Jun. 14, 2000 (KR) .................................. P2000-32588

(51) Int. Cl.$^7$ ............................................ G02F 1/1335
(52) U.S. Cl. .......................... 349/98; 349/96; 349/113; 349/114; 349/117
(58) Field of Search ............................ 349/96–98, 113, 349/114, 117, 119

(56) References Cited

U.S. PATENT DOCUMENTS

| | | | | |
|---|---|---|---|---|
| 4,726,663 A | * | 2/1988 | Buzak | 349/80 |
| 5,507,404 A | * | 4/1996 | Ryu | 216/24 |
| 5,627,666 A | * | 5/1997 | Sharp et al. | 349/74 |
| 5,796,454 A | * | 8/1998 | Ma | 349/98 |
| 6,008,871 A | * | 12/1999 | Okumura | 349/61 |
| 6,217,955 B1 | * | 4/2001 | Coates et al. | 428/1.31 |
| 6,295,109 B1 | * | 9/2001 | Kubo et al. | 349/119 |
| 2001/0017680 A1 | * | 8/2001 | Kim | 349/115 |
| 2002/0030776 A1 | * | 3/2002 | Khan et al. | 349/114 |

* cited by examiner

*Primary Examiner*—Tarifur R. Chowdhury
(74) *Attorney, Agent, or Firm*—Morgan, Lewis & Bockius LLP

(57) ABSTRACT

A transparent reflective liquid crystal display device (LCD) is provided that is adaptive for improving a light efficiency and color purity. In the device, a first circular polarizer transmits circular-polarized light having a first direction input from the backlight unit while reflecting circular-polarized light having a second direction contrary to the first direction. A second circular polarizer is arranged in opposition to the first circular polarizer to transmit the circular-polarized light having the second direction while reflecting the circular-polarized light having the first direction. A circular-polarizing color filter is provided at one side of the second circular polarizer to extract circular-polarized light of a specific visible light wavelength band in the circular-polarized light having the first direction. A reflecting member is arranged in opposition to the second circular polarizer to reflect external light, and has a hole formed in opposition to the circular-polarizing color filter to transmit the circular-polarized light having the specific visible light wavelength band via the hole. An absorptive color filter and a CLC color filter may be used in the LCD to improve color purity.

15 Claims, 10 Drawing Sheets

TRANSPARENT REFLECTIVE LIQUID CRYSTAL DISPLAY

This application claims the benefit of Korean Patent Application No. P00-32588, filed on Jun. 14, 2000, which is hereby incorporated by reference.

BACKGROUND OF THE INVENTION

1. Field of the Invention

This invention relates to a liquid crystal display device, and more particularly, to a transparent reflective liquid crystal display that is capable of improving a light efficiency and a color purity.

2. Description of the Related Art

Generally, a liquid crystal display (LCD) of active matrix driving system uses thin film transistors (TFT's) as switching devices to display a natural moving picture. Since such a liquid crystal display can be made into a smaller-size device than a CRT (cathode ray tube), it is commercially available as a monitor in portable devices, such as portable televisions, laptop personal computers, and the like.

Such a LCD requires a separate light source because it is not a self-emitting device. The LCD can be largely classified into a transmissive type and a reflective type depending on a type of light source. The transmissive LCD has a backlight unit installed opposite the rear substrate of two transparent substrates into which a liquid crystal is injected, to transmit light being input from the backlight unit to a screen. On the other hand, the reflective LCD has a reflective surface formed on the rear substrate of two transparent substrates into which a liquid crystal is injected, to reflect an external light or a separate auxiliary light incident the rear substrate via the front substrate to a screen.

Recent investigations have been made to study a transparent reflective LCD capable of having the advantages of both the transmissive type and the reflective type.

Referring to FIG. 1, the conventional transparent reflective LCD includes a front substrate 108 and a rear substrate 104 having a liquid crystal 106 injected therebetween, a $\lambda/4$ plate 109 and a linear polarizer 110 disposed on the front surface of the front substrate 108, an absorptive color filter 107 installed between the front substrate 108 and the liquid crystal 106, a $\lambda/4$ plate 103 and a linear polarizer 102 disposed on the rear surface of the rear substrate 104, and a metal reflecting plate 105 installed between the rear substrate 104 and the liquid crystal 106. Holes 105a are defined in the metal reflecting plate 105 at a desired interval.

An external light is converted into a specific linear-polarized light by means of the linear polarizer 110 and thereafter is converted into a circular-polarized light by means of the $\lambda/4$ plate 109 to be incident to the metal reflecting plate 105 via the absorptive color filter 107 and the liquid crystal 106. The external light being incident to the metal reflecting plate 105 retrogresses a light path to go toward the display screen. At this time, the absorptive color filter 107 transmits only a visible light having a specific wavelength band and absorbs a light beam having other wavelength bands. A light input from the backlight unit 101 is converted into a specific linear-polarized light by means of the linear polarizer 102, is then converted into a circular-polarized light by means of the $\lambda/4$ plate 103 to traverse the rear substrate 104, and thereafter is incident to the metal reflecting plate 105. Light from the backlight unit 101 incident the metal reflecting plate 105 in this manner also is incident the liquid crystal 106 via a hole 105a of the metal reflecting plate 105, and then goes toward the display screen via the liquid crystal 106.

However, the conventional transparent reflective LCD has a drawback in that a light irradiated from the backlight unit 101 has a large light loss due to the linear polarizer 102 at the rear substrate side. Consequently, a light absorption ratio of the linear polarizer 102 is about 55% or more. Also, only a portion of the light passing through the linear polarizer 102 goes toward the display screen via the hole 105a of the metal reflecting plate 105. At this time, since light reflects from the metal reflecting plate 105 without passing through the hole 105a and retrogresses a light path incident to the linear polarizer 102 in a changed polarization state, most reflective light is absorbed by the linear polarizer 102. In the case of displaying a picture or an image using the transmissive type, a light efficiency is deteriorated because only a slight portion of a light generated from the backlight unit 101 is utilized for a display light. Furthermore, the conventional transparent reflective LCD has a problem in that it is difficult to obtain acceptable color purity.

SUMMARY OF THE INVENTION

Accordingly, the present invention is directed to a transparent reflective liquid crystal display that substantially obviates one or more of the problems due to limitations and disadvantages of the related art.

In one aspect of the present invention, a transparent reflective liquid crystal display is provided with a structure adapted for improving light efficiency.

In another aspect of the present invention, a transparent reflective liquid crystal display is provided with a structure that provides adequate color purity.

In order to achieve these and other objects of the invention, a transparent reflective liquid crystal display device according to an embodiment of the present invention includes a first circular polarizer for transmitting a circular-polarized light input from a backlight unit having a first direction while reflecting a circular-polarized light having a second direction contrary to the first direction. A second circular polarizer is arranged in opposition to the first circular polarizer and transmits circular-polarized light having the second direction while reflecting the circular-polarized light having the first direction. Such an arrangement that includes a pair circular polarizers can improve the ratio of light reaching a display screen from a backlight unit to the light emitted from a backlight unit.

To provide increased color purity, a circular-polarizing color filter is provided at one side of the second circular polarizer for extracting a circular-polarized light having a specific visible light wavelength band in the circular-polarized light having the first direction, and a reflecting member is arranged in opposition to the second circular polarizer to reflect light from an external source. The reflecting member has a hole formed in opposition to the circular-polarizing color filter to transmit the circular-polarized light having the specific visible light wavelength band via the hole.

A transparent reflective liquid crystal display device according to another embodiment of the present invention includes a circular polarizer for transmitting a circular-polarized light having a first direction input from the backlight unit while reflecting a circular-polarized light having a second direction contrary to the first direction. A $\lambda/4$ plate is arranged in opposition to the circular polarizer for converting a circular-polarized light input from the circular polarizer into a linear-polarized light having a specific direction.

To improve color purity, a first circular-polarizing color filter is provided for reflecting a circular-polarized light having a specific visible light wavelength band in a circular-polarized light from an external light source, and a light-absorbing member is provided at a rear side of the circular-polarizing color filter for absorbing light that transmits through the circular-polarizing color filter. Between the first λ/4 plate and the light-absorbing member, a reflecting member may be provided for reflecting light, and a second circular-polarizing color filter for transmitting a circular-polarized light having a specific visible light band in the circular-polarized light input from the circular polarizer may be provided in a hole passing through the first circular-polarizing color filter, the light-absorbing member, the reflecting member, and/or the λ/4 plate.

It is to be understood that both the foregoing general description and the following detailed description are exemplary and explanatory only and are intended to provide further explanation of the invention, as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the invention, examples of which are illustrated in the accompanying drawings. Whenever possible, the same reference numbers will be used throughout the drawings to refer to the same or like parts.

Figure 1:
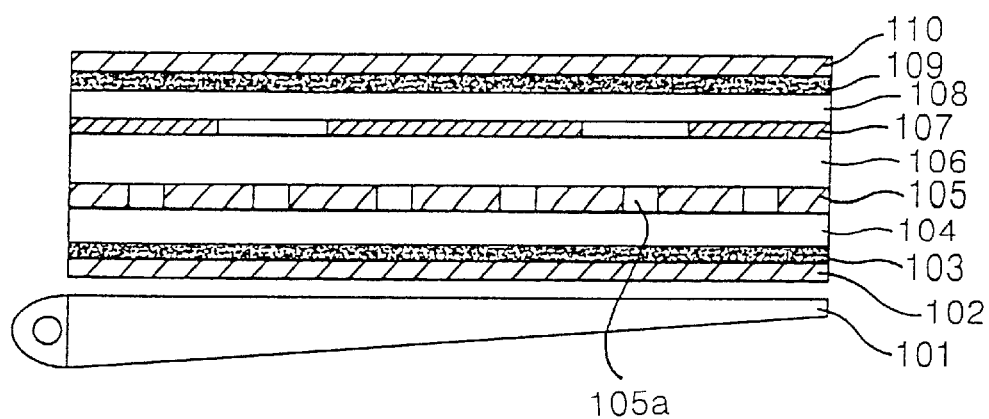
FIG. 1 is a section view showing a structure of a conventional transparent reflective liquid crystal display.
Figure 2:
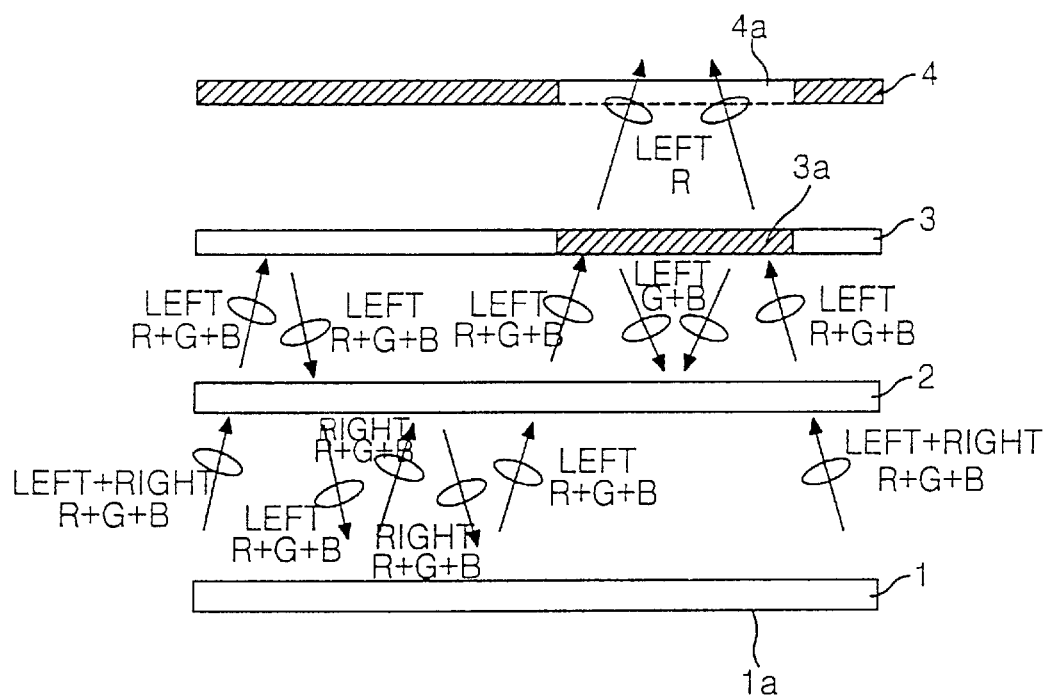
FIG. 2 is a section view showing an exemplary structure of a transparent reflective liquid crystal display according to a first embodiment of the present invention.

Referring to FIG. 2, there is shown a transparent reflective liquid crystal display (LCD) according to a first embodiment of the present invention. The transparent reflective LCD includes first and second cholesteric liquid crystal (CLC) polarizers 2 and 3 arranged between a backlight unit 1 and a metal reflecting plate 4. The backlight unit 1 may include a lamp and a light guide (not shown), for example, and the bottom of the backlight unit 1 may be provided with a reflecting plate 1a. A hole 4a is defined in the metal reflecting plate 4. The first CLC polarizer 2 plays a role to reflect a right circular-polarized light beam being incident thereto while transmitting a left circular-polarized light beam. Contrarily, the second CLC polarizer 3 plays a role to reflect a left circular-polarized light beam being incident thereto while transmitting a right circular-polarized light beam. The second CLC polarizer 3 is provided with a CLC color filter 3a in substantial alignment with the hole 4a of the metal reflecting plate 4.

The transparent reflective LCD as shown in FIG. 2 is operated in a transmission mode that exploits a light generated from the backlight unit 1 as a light source, and in a reflection mode that exploits an external light as a light source.

In the transmission mode, a light generated from the backlight unit 1 includes all linear polarization and circular polarization components, as well as light components having all visible light bands. If such light is incident the first CLC polarizer 2 at a desired angle, then a right circular-polarized light is reflected by the first CLC polarizer 2 while a left circular-polarized light is transmitted to the second CLC polarizer 3 with keeping its polarization characteristic. The right circular-polarized light reflected by the first CLC polarizer 2 is converted into a left circular-polarized light by means of the reflecting plate 1a of the backlight unit 1 to be incident the first CLC polarizer 2.

Since a polarization characteristic of the reflected light is changed into a left circular-polarized light in this manner, most left circular-polarized light and most right circular-polarized light generated from the backlight unit 1 are converted into a left circular-polarized light to transmit the first CLC polarizer 2. Only specific wavelength pass-band components of light incident the CLC color filter 3a in a left circular-polarized light (having transmitted the first CLC polarizer 2) passes through the CLC color filter 3a.

The left circular-polarized light being incident to the second CLC polarizer 3 other than the CLC color filter 3a is reflected back to the first CLC polarizer 2 and thereafter transmits the first CLC polarizer 2 to be reflected by the reflecting plate 1a of the backlight unit 1, thereby being changed into a right circular-polarized light. Then, this right circular-polarized light is again reflected by the first CLC polarizer 2 and changed into a left circular-polarized light by the reflecting plate 1a of the backlight unit 1 to be transmitted to the first CLC polarizer 2. The left circular-polarized light reflected from the second CLC polarizer 3 in this manner transmits through the first CLC polarizer 2 and then is repetitively reflected between the reflecting plate 1a the first CLC polarizer 2. Thereafter, the repetitively reflected left circular-polarized light is finally converted into a left circular-polarized light to be incident on the CLC color filter 3a.

Accordingly, most light generated from the backlight unit 1 transmits through the CLC color filter 3a and emerges as a light beam having a specific visible light band (e.g., a red visible light). Then, a light passing through the hole 4a of the metal reflecting plate 4 emerges on the display screen as a left circular-polarized light at a high color purity of any one of red (R), green (G) and blue (B) colors.

Otherwise, in the reflection mode, external light is reflected by the metal reflecting plate 4 and emerges on the display screen.

Figure 3:
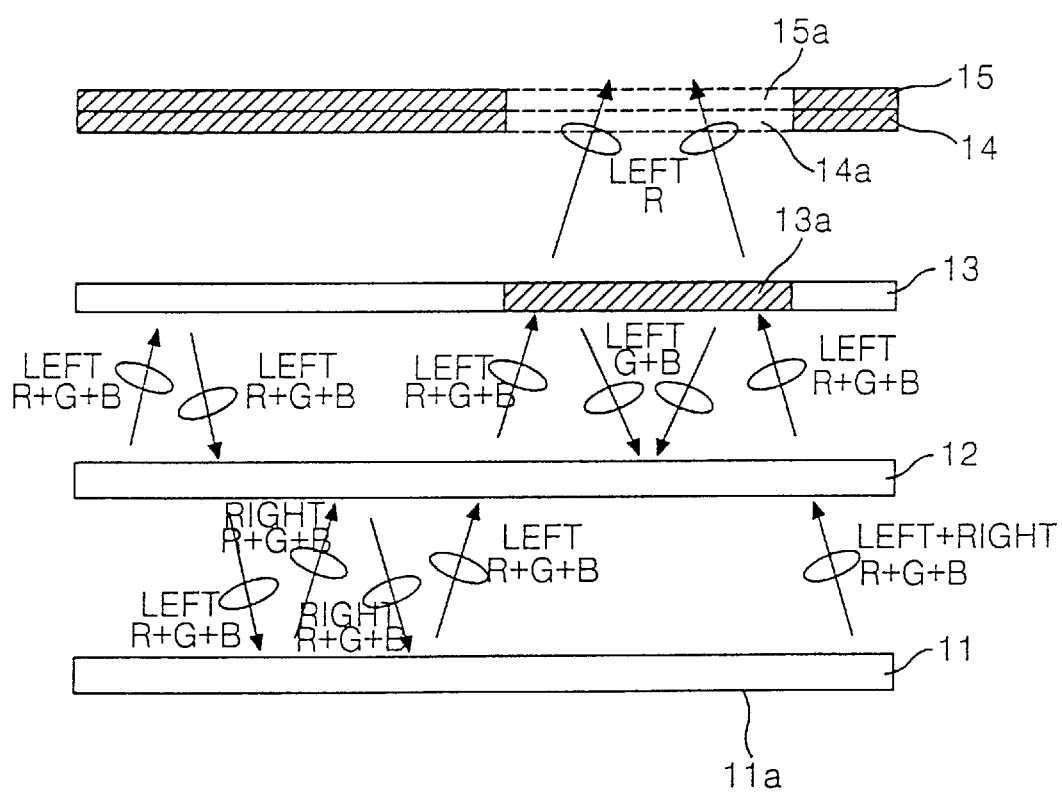
FIG. 3 is a section view showing an exemplary structure of a transparent reflective liquid crystal display according to a second embodiment of the present invention.

Referring to FIG. 3, there is shown a transparent reflective LCD according to a second embodiment of the present invention. The transparent reflective LCD includes a light-absorbing layer 14 and a CLC color filter 15 disposed thereon, and first and second CLC polarizers 12 and 13 arranged between the light-absorbing layer 14 and a backlight unit 1. The light-absorbing layer 14 plays a role of absorbing a light being incident thereto, and one side thereon is provided with a hole 14a through which light may pass. The CLC color filter 15 plays a role of reflecting only light having a specific visible light band (e.g., a red visible light), and is provided with a hole 15a opposed to or substantially aligned with the hole 14a of the light-absorbing layer 14. The bottom of the backlight unit 11 is provided with a reflecting plate 11a. The first CLC polarizer 12 plays a role of reflecting a right circular-polarized light beam being incident thereon while transmitting a left circular-polarized light beam. Contrarily, the second CLC polarizer 13 plays a role of reflecting a left circular-polarized light beam being incident thereon while transmitting a right circular-polarized light beam. The second CLC polarizer 13 is provided with a CLC color filter 13a in substantial alignment with the hole 14a of the light-absorbing layer 14.

The transparent reflective LCD as shown in FIG. 3 is operated in a transmission mode that exploits a light generated from the backlight unit 11 as a light source, and in a reflection mode that exploits an external light as a light source.

In the transmission mode, if a light generated from the backlight unit 11 is incident to the first CLC polarizer 12 at a desired angle, then a right circular-polarized light is reflected by the first CLC polarizer 12 while a left circular-polarized light is transmitted to the second CLC polarizer 13 with its polarization characteristic maintained. The right circular-polarized light reflected by the first CLC polarizer 12 is converted into a left circular-polarized light by means of the reflecting plate 11a of the backlight unit 11 to be incident to the first CLC polarizer 12. Since a polarization characteristic of the reflected light is changed into a left circular-polarized light in this manner, most left circular-polarized light and most right circular-polarized light generated from the backlight unit 11 are converted into a left circular-polarized light to transmit through the first CLC polarizer 12.

Only specific wavelength passing band components (e.g., a red visible light) of a light being incident to the CLC color filter 13a, in a left circular-polarized light having transmitted through the first CLC polarizer 12, passes through the CLC color filter 13a. The left circular-polarized light reflected by the second CLC polarizer 13 other than the CLC color filter 13a transmits through the first CLC polarizer 12 and then is repetitively reflected between the reflecting plate 11a and the first CLC polarizer 12. Thereafter, the repetitively reflected left circular-polarized light is finally converted into a left circular-polarized light to be incident the CLC color filter 13a.

Accordingly, most light generated from the backlight unit 11 transmits through the CLC color filter 13a resulting in a light beam having a specific visible light band, and a light passing through the holes 14a and 15a of the light-absorbing layer 14 and the CLC color filter 15 emerges on the display screen as a left circular-polarized light at a high color purity of any one of red (R), green (G) and blue (B) colors.

Otherwise, in the reflection mode, if an external light is incident the CLC color filter 15, then only a specific visible light band (e.g., a red (R), green (G) or blue (B) visible light wavelength band) is reflected while a light having other wavelength bands is absorbed into the CLC color filter 15 and the light-absorbing layer 14.

Figure 4:
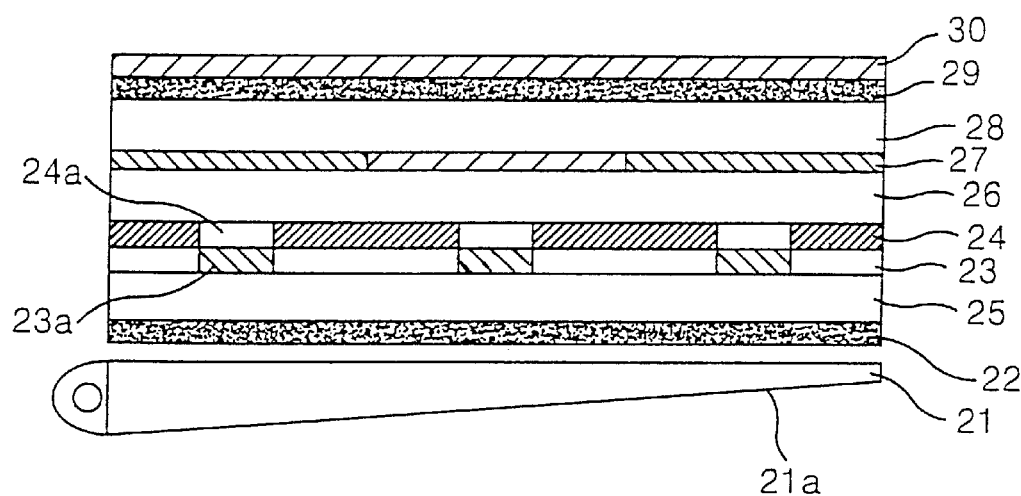
FIG. 4 is a section view showing an exemplary structure of a transparent reflective liquid crystal display according to a third embodiment of the present invention.

Referring to FIG. 4, there is shown a transparent reflective LCD according to a third embodiment of the present invention. The transparent reflective LCD includes a front substrate 28 and a rear substrate 25 between which a liquid crystal 26 is injected. A $\lambda/4$ plate 29 and a linear polarizer 30 are provided on the front side of the front substrate 28. An absorptive color filter 27 is arranged between the front substrate 28 and the liquid crystal 26. First and second CLC polarizers 22 and 23 are provided on the front side and the rear side of the rear substrate 25, respectively, and a backlight unit 21 installed behind the first CLC polarizer 22.

The linear polarizer 30 at the front substrate side plays a role of converting an external light into a specific linear-polarized light (i.e., P wave or S wave) to improve a light efficiency of an external light being incident to the liquid crystal 26.

An alignment layer (not shown) is formed on the front substrate 28 and the rear substrate 25 and used for setting up a pre-tilt angle. A common electrode (not shown) is formed between the alignment layer and the rear side of the front substrate 28. A pixel electrode (not shown) is formed between the alignment layer and the front side of the rear substrate 25. The common electrode and pixel electrode are made from a transparent conductive material, such as Indium Tin Oxide (ITO).

The $\lambda/4$ plate 29 converts a linear-polarized light that is input from the linear polarizer 30 into a circular-polarized light (i.e., left circular-polarized light or right circular-polarized light) and converts a circular-polarized light that is input from the absorptive color filter 27 into a linear-polarized light. The absorptive color filter 27 passes a specific visible band of wavelength of the light from the external light source incident via the front substrate 28 while it absorbs other wavelengths. The absorptive color filter 27 also transmits a reflective light having a specific visible light wavelength that is incident from the liquid crystal 26. The metal reflecting plate 24 reflects a light being incident via the liquid crystal 26 or the second CLC polarizer 23, and is provided with a hole 24a for guiding a light input from the rear substrate 25 into the liquid crystal 26.

The second CLC polarizer 23 plays a role of reflecting a left circular-polarized light beam being incident via the rear substrate 25 while transmitting a right circular-polarized light beam to the metal reflecting plate 24. The second CLC polarizer 23 is provided with a CLC color filter 23a in substantial alignment with the hole 24a of the metal reflecting plate 24. The CLC color filter 23a guides light having a specific visible light wavelength in a left circular-polarized light being incident via the rear substrate 25 into the hole 24a of the metal reflecting plate 24. The first CLC polarizer 22 reflects a right circular-polarized light beam input from the backlight unit 21 while transmitting a left circular-polarized light to the rear substrate 25. The backlight unit 21 may consist of a lamp, a light guide and a reflecting plate 21a, or the like, and generates a white light that is input into the first CLC polarizer 22.

In a transmission mode of the transparent reflective LCD shown in FIG. 4, a light generated from the backlight unit 21 transmits through the first CLC polarizer 22 and is entirely changed into a left circular-polarized light. The left circular-polarized light propagates between the second CLC polarizer 23 and the backlight unit 21 and concentrates on the CLC color filter 23a. In this manner, the left circular-polarized light with a specific visible light wavelength concentrating on the color filter 23a passes through the hole 24a of the metal reflecting plate 24 and then transmits through the liquid crystal 26, the absorptive color filter 27, the front substrate 28, the λ/4 plate 29 and the linear polarizer 30 in turn, to thereby emerge on the display screen.

In a reflection mode, if an external light from the front substrate 28 is incident the absorptive color filter 27, then only a specific visible light band (e.g., a red (R), green (G) or blue (B) visible light band) is transmitted while other wavelength bands are absorbed. An external light having transmitted the absorptive color filter 27 in this manner is reflected by the metal reflecting plate 24 to transmit through the absorptive color filter 27 again and then transmits through the front substrate 28, the λ/4 plate 29 and the linear polarizer 30 in turn, to thereby emerge on the display screen.

Figure 5:
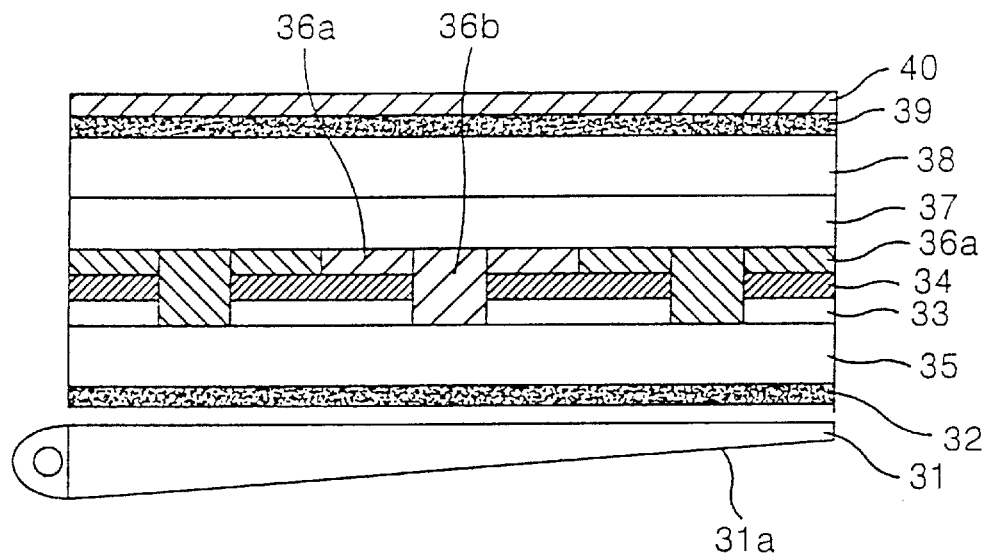
FIG. 5 is a section view showing an exemplary structure of a transparent reflective liquid crystal display according to a fourth embodiment of the present invention.

Referring to FIG. 5, there is shown a transparent reflective LCD according to a fourth embodiment of the present invention. The transparent reflective LCD includes a front substrate 38 and a rear substrate 35 between which a liquid crystal is injected. A λ/4 plate 39 and a linear polarizer 40 are provided on the front side of the front substrate 38. First and second CLC polarizers 33 and 32 are provided on the front side and the rear side of the rear substrate 35, respectively. A light-absorbing layer 34 and a single-layer CLC color filter 36a are arranged between the liquid crystal 37 and the second CLC polarizer 33 while a double-layer CLC color filter 36b is formed to pass through the single-layer color filter 36a, the light-absorbing layer 34 and the second CLC polarizer 33. A backlight unit 31 with reflecting plate 31a may be provided behind the first CLC polarizer 32.

The linear polarizer 40 converts an external light into a specific linear-polarized light. The λ/4 plate 39 converts a linear-polarized light from the linear polarizer 40 into a circular-polarized light, and also converts a circular-polarized light being incident from the front substrate 38 into a linear-polarized light having a light axis parallel to a light axis of the linear polarizer 40. An alignment layer (not shown) is formed on the front substrate 38 and the rear substrate 35 and is used for setting up a pre-tilt angle. A common electrode (not shown) is formed between the alignment layer and the rear side of the front substrate 38. A pixel electrode (not shown) is formed between the alignment layer and the front side of the rear substrate 35.

The single-layer CLC color filter 36a reflects a circular-polarized light with a specific visible light band being incident via the liquid crystal 37. The double-layer color filter 36b transmits a right circular-polarized light with a specific visible light band being incident via the rear substrate 35 to the liquid crystal 37 and reflects a circular-polarized light with a specific visible light band being incident via the liquid crystal 37. The light-absorbing layer 34 absorbs lights input from the single-layer CLC color filters 36a and the second CLC polarizer 33. The second CLC polarizer 33 plays a role of reflecting a right circular-polarized light being incident from the rear substrate 25 while transmitting a left circular-polarized light being incident from the rear substrate 35. The first CLC polarizer 32 reflects a left circular-polarized light input from the backlight unit 31 while transmitting a right circular-polarized light input from the backlight unit 31. The backlight unit 31 consists of a lamp, a light guide and a reflecting plate 31a, or the like, and generates a white light that is input into the first CLC polarizer 32.

In a transmission mode of the transparent reflective LCD shown in FIG. 5, a light generated from the backlight unit 31 is entirely changed into a right circular-polarized light by the first CLC polarizer 32 and the reflecting plate 31a of the backlight unit 31 to be incident the second CLC polarizer 33 and the double-layer CLC color filter 36b. The right circular-polarized light that is incident the second CLC polarizer 33 is reflected between the second CLC polarizer 33 and the reflecting plate 31a of the backlight unit 31 to be incident the double CLC color filter 36b as right circular-polarized light.

In a reflection mode, left circular-polarized light having a specific visible light wavelength band of external light that is incident the front substrate 38 is reflected by the single-layer CLC color filter 36a and the double-layer color filter 36b to thereby emerge on the display screen as a specific color visible light.

Figure 6:
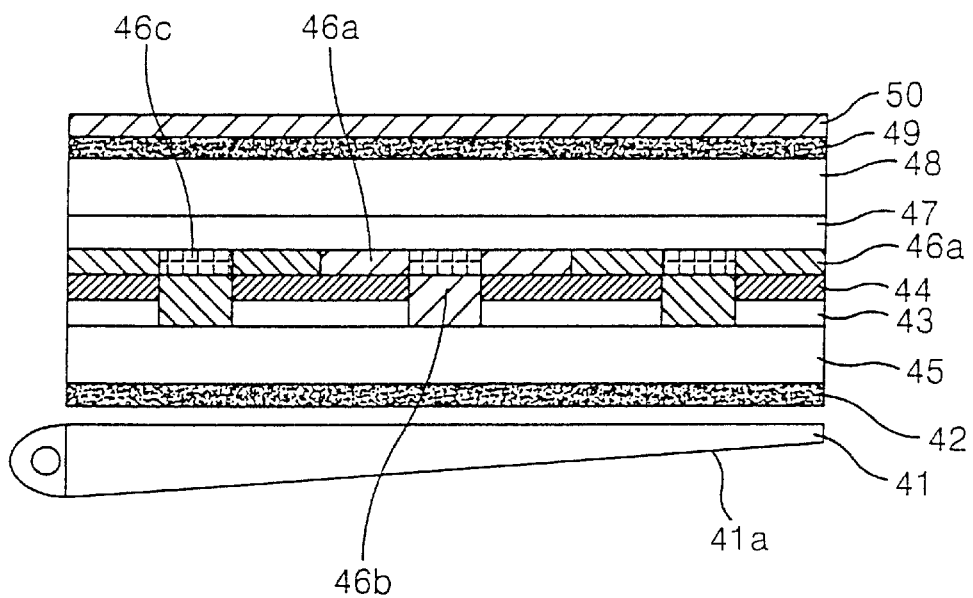
FIG. 6 is a section view showing an exemplary structure of a transparent reflective liquid crystal display according to a fifth embodiment of the present invention.

Referring to FIG. 6, there is shown a transparent reflective LCD according to a fifth embodiment of the present invention. The transparent reflective LCD includes a front substrate 48 and a rear substrate 45 between which is injected a liquid crystal 47. A λ/4 plate 49 and a linear polarizer 50 are provided on the front side of the front substrate 48. First and second CLC polarizers 42 and 43 are provided on the front side and the rear side of the rear substrate 45, respectively. A light-absorbing layer 44 and a single-layer CLC color filter 46a are disposed between the liquid crystal 47 and the second CLC polarizer 43. An absorptive color filter 46c is formed on the single-layer CLC color filter 46a, and a double-layer CLC color filter 46b formed to pass through the absorptive color filter 46c, the light-absorbing layer 44 and the second CLC polarizer 43.

A backlight unit 41 with a reflecting plate 41a is arranged behind the first CLC polarizer 42 as an internal light source for the LCD. An alignment layer (not shown) is formed on the front substrate 48 and the rear substrate 45 and is used for setting up a pre-tilt angle. A common electrode (not shown) is formed between the alignment layer and the rear side of the front substrate 48, and a pixel electrode (not shown) is formed between the alignment layer and the front side of the rear substrate 45.

The linear polarizer 50 converts external light into a specific linear-polarized light. The λ/4 plate 49 converts the linear-polarized light from the linear polarizer 50 into a circular-polarized light and also converts circular-polarized light incident from the front substrate 48 into linear-polarized light. The single-layer CLC color filter 46a reflects circular-polarized light having a specific visible light band that is incident the liquid crystal 47.

The absorptive color filter 46c plays a role of further improving the color purity of a right circular-polarized light with a specific visible light wavelength band input from the double-layer CLC color filter 46b. The double-layer color filter 46b transmits a right circular-polarized light with a specific visible light band being incident via the rear substrate 45 to the liquid crystal 47 and reflects a circular-polarized light with a specific visible light band being incident via the liquid crystal 47. The light-absorbing layer 44 absorbs light input from the single-layer CLC color filters 46a and the second CLC polarizer 43. The second CLC polarizer 43 plays a role of reflecting right circular-polarized light being incident via the rear substrate 45 while transmitting a left circular-polarized light that is incident from the rear substrate 45. The first CLC polarizer 42 reflects left circular-polarized light input from the backlight unit 41 while transmitting right circular-polarized light input from the backlight unit 41. The backlight unit 41 consists of a lamp, a light guide and a reflecting plate 41a, or the like, and generates a white light that is input into the first CLC polarizer 42.

The operations in the transmission mode and the reflection mode of the transparent reflective LCD shown in FIG. 6 are substantially identical to those described above for the LCD of FIG. 5.

In the reflection mode, the absorptive color filter 46c transmits light having a specific visible light wavelength band in light that is input from the double-layer CLC color filter 46b while absorbing a light having other wavelength bands. Consequently, improvement is made to the purity of light color input from the double-layer color filter 46b.

Figure 7A:
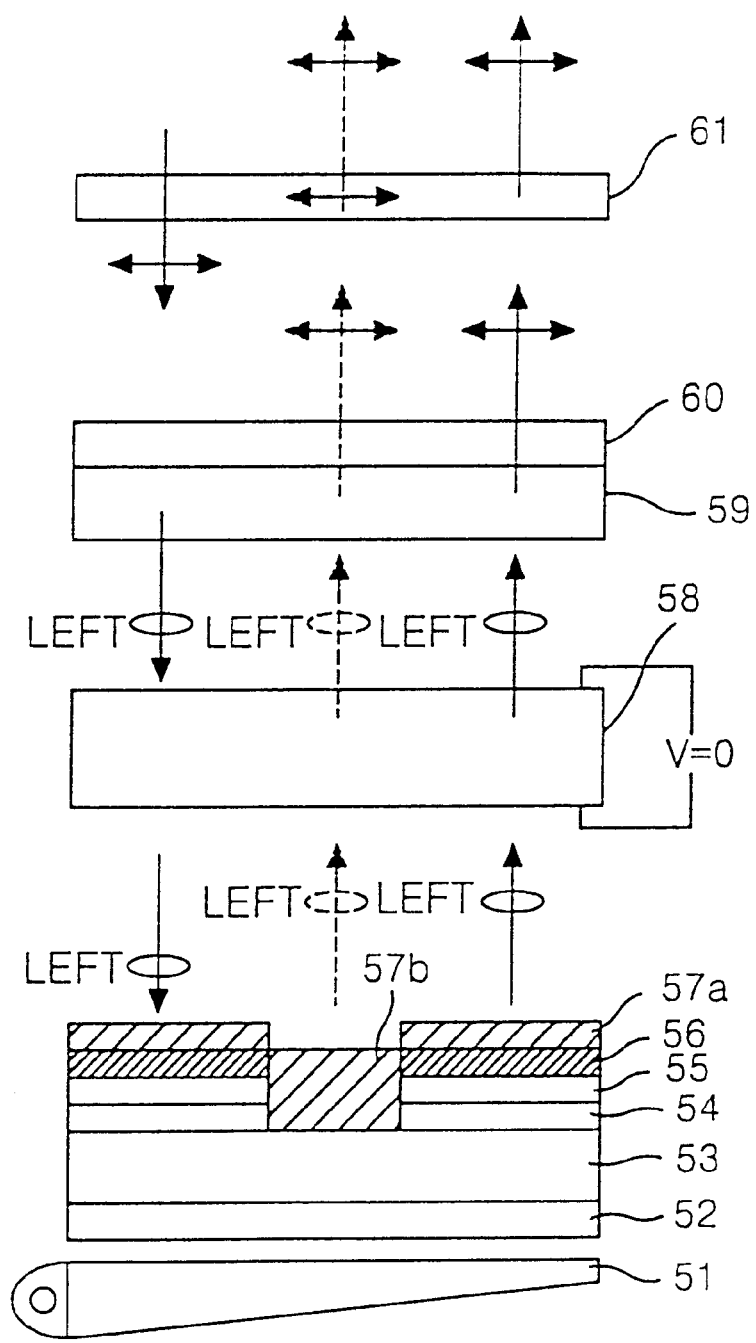
FIGS. 7A and 7B are section views showing an exemplary structure of a transparent reflective liquid crystal display according to a sixth embodiment of the present invention.
Figure 7B:
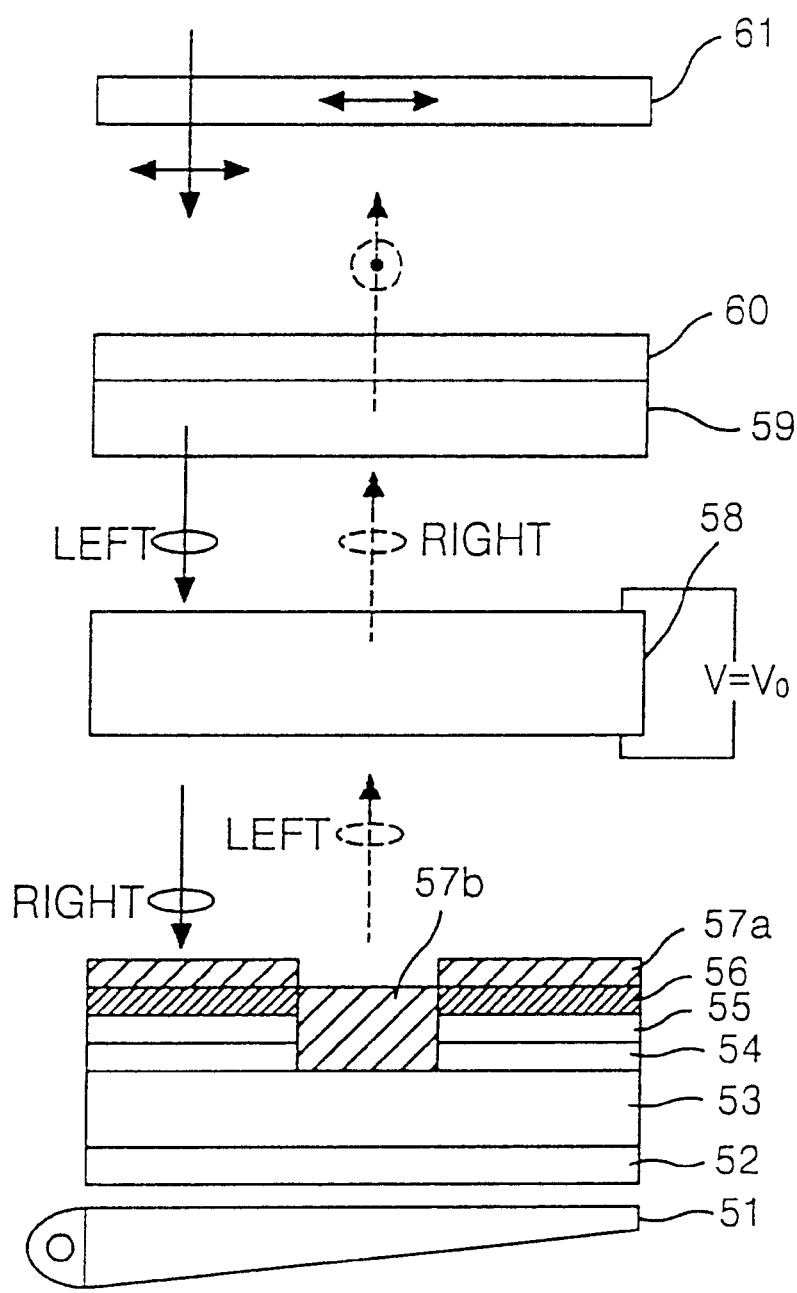

Referring to FIG. 7A and FIG. 7B, there is shown a transparent reflective LCD according to a sixth embodiment of the present invention, which normally takes a white mode display state when a voltage is not applied across the liquid crystal.

As shown in FIG. 7A, the transparent reflective LCD includes a front substrate 59 and a rear substrate 53 between which a liquid crystal 58 is injected. A first λ/4 plate 60 and a linear polarizer 61 are provided on the front side of the front substrate 59. A second λ/4 plate 54 and a CLC polarizer 52 are provided on the front side and the rear side of the rear substrate 53, respectively. A metal reflecting plate 55, a light-absorbing layer 56 and a single-layer CLC color filter 57a are provided between the liquid crystal 58 and the second λ/4 plate 54. A double-layer CLC color filter 57b is formed to pass through the second λ/4 plate 54, the metal reflecting plate 55 and the light absorbing layer 56. The linear polarizer 61 converts external light into a specific linear-polarized light. The first λ/4 plate 60 converts linear-polarized light from the linear polarizer 61 into a circular-polarized light and also converts a circular-polarized light being incident via the front substrate 59 into a linear-polarized light.

The liquid crystal 58 may be of any one of π cell and π/2 cell gaps, or the like, but will be described assuming that it is a π cell gap. The CLC color filter 52 transmits a left circular-polarized light input from the backlight unit 51 while reflecting right circular-polarized light input from the backlight unit 51. The second λ/4 plate 54 plays a role of converting circular-polarized light that is incident from the rear substrate 53 into linear-polarized light. The metal reflecting plate 55 is provided with a plurality of holes through which it passes circular-polarized light input from the second λ/4 plate 54 to thereby transmit the circular-polarized light input from the second λ/4 plate 54 into the liquid crystal 58. The light-absorbing layer 56 plays a role of absorbing circular-polarized light input from the single-layer CLC color filter 57a.

The light-absorbing layer 56 has a hole formed in substantial alignment with a hole defined in the metal reflecting plate 55 so as to guide circular-polarized light being incident from the hole of the metal reflecting plate 55 into the single-layer CLC color filter 57a. The single-layer CLC color filter 57a reflects circular-polarized light of a specific visible light wavelength band of the circular-polarized light that is incident from the liquid crystal 58 while transmitting light of other wavelength bands to the light-absorbing layer 56. The double-layer color filter 57b is filled in the holes of the second λ/4 plate 54, the metal reflecting plate 55 and the light-absorbing layer 56 so as to transmit circular-polarized light of a specific visible light wavelength band (e.g., a red visible light) that is incident from the rear substrate 53 to the liquid crystal 58 while reflecting a circular-polarized light of other wavelength bands (e.g., green and blue visible lights).

FIG. 7A and FIG. 7B show light paths in a display (or white) state and a non-display (or black) state, respectively. In FIGS. 7A and 7B, the solid lines indicate a light path in the reflection mode in which external light is exploited as a light source, whereas the dotted lines indicate a light path in the transmission mode in which light generated from the backlight unit 51 is exploited as a light source.

In the case of displaying a picture in the transmission mode, only a left circular-polarized light (indicated by the dotted line in FIG. 7A in a light generated from the backlight unit 51) passes through the CLC polarizer 52 to be incident to the double-layer CLC color filter 57b. Only visible light of a specific visible light wavelength band (e.g., a red visible light) in the left circular-polarized light being incident to the double-layer color filter 57b passes through the double-layer CLC color filter 57b to be incident the liquid crystal 58. At this time, since a voltage is not applied to the liquid crystal 58, the left circular-polarized light passing through the double-layer CLC color filter 57b is incident, via the front substrate 59, to the first λ/4 plate 60 while maintaining its polarization characteristic. The left circular-polarized light that is incident the first λ/4 plate 60 is converted into a linear-polarized light in a direction identical to a light axis of the linear polarizer 61 and then passes through the linear polarizer 61 to emerge on the display screen.

In the case of displaying a picture in the reflection mode, linear-polarized light passing through the linear polarizer 61 that is incident the first λ/4 plate 60 is converted into left circular-polarized light by the first λ/4 plate 60. This left circular-polarized light is incident, via the liquid crystal 58, to the single-layer color filter 57a while maintaining its polarization characteristic. Only a specific visible light wavelength band (e.g., a red visible light) of the left circular-polarized light that is incident the single-layer CLC color filter 57a is reflected from the single-layer CLC color filter 57a into the liquid crystal 58, whereas other wavelength bands (e.g., green and blue visible lights) are absorbed by the light-absorbing layer 56 and become extinct. The left circular-polarized light with a specific visible light band reflected by the single-layer CLC color filter 57a is again incident, via the liquid crystal 58 and the front substrate 59, the first λ/4 plate 60. The reflective light that is incident the first λ/4 plate 60 is converted into linear-polarized light in a direction identical to a light axis of the linear polarizer 61 and then passes through the linear polarizer 61 to emerge on the display screen.

As shown in FIG. 7b, if a voltage is applied to the liquid crystal 58, then external light converted into left circular-polarized light by the first λ/4 plate 60 is doubly-refracted by the liquid crystal 58 and causes a phase change of 180°. Also, light from the backlight unit 51 passing through the CLC polarizer 52 and the double-layer CLC color filter 57b that is incident the liquid crystal 58 changes its phase by 180° because of the biased liquid crystal 58. Accordingly, since external light passing through the liquid crystal 58 is converted into a right circular-polarized light, it passes through the single-layer CLC color filter 57a and is entirely absorbed by the light-absorbing layer 56, and thus becomes extinct. Further, the light from the backlight unit converted into a right circular-polarized light by the liquid crystal 58 is converted into a linear-polarized light having a light axis perpendicular to a light axis of the linear polarizer 61 by the first λ/4 plate 60.

Figure 8:
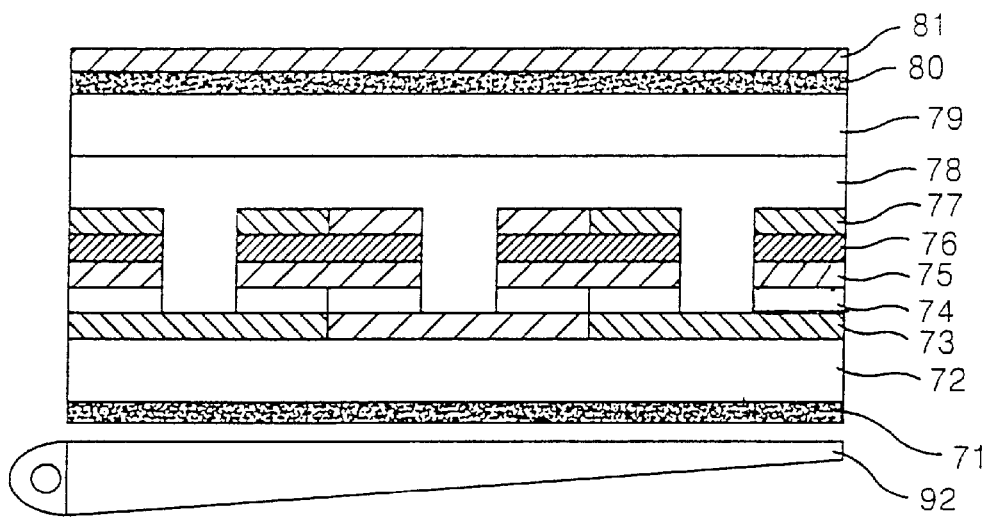
FIG. 8 is a section view showing an exemplary structure of a transparent reflective liquid crystal display according to a seventh embodiment of the present invention.

Referring to FIG. 8, there is shown a transparent reflective LCD according to a seventh embodiment of the present invention.

The transparent reflective LCD includes a front substrate 79 and a rear substrate 72 between which a liquid crystal 78 is injected. A first λ/4 plate 80 and a linear polarizer 81 are provided on the front side of the front substrate 79. A first CLC color filter 77, a light-absorbing layer 76, a metal reflecting plate 75, a second λ/4 plate 74 and a second CLC color filter 73 are provided between the liquid crystal 78 and the rear substrate 72, and a CLC polarizer 71 is provided on the rear side of the rear substrate 72. An alignment layer (not shown) may be provided on the front substrate 79 and the rear substrate 72 for setting up a pre-tilt angle. A common electrode (not shown) may be formed between the alignment layer and the rear side of the front substrate 79, and pixel electrode (not shown) may be formed between the alignment layer and the front side of the rear substrate 72.

The linear polarizer 81 converts externally provided light into specific linear-polarized light. The first λ/4 plate 80 converts the linear-polarized light from the linear polarizer 81 into circular-polarized light and also converts circular-polarized light being incident via the front substrate 79 into linear-polarized light. The first CLC color filter 77, the light-absorbing layer 76, the metal reflecting plate 75 and the second λ/4 plate 74 are provided with holes passing through them. The first CLC color filter 77 reflects light of a specific visible light wavelength band in circular-polarized light that is incident from the liquid crystal 78 while transmitting a light of other wavelength bands to the light-absorbing layer 76. The light-absorbing layer 76 plays a role of absorbing light input from the first CLC color filter 77. The metal reflecting plate 75 transmits light input from the second CLC color filter 73 to the liquid crystal 78 via the holes. The second CLC color filter 73 transmits a circular-polarized light of a specific visible wavelength band (e.g., a red visible light) that is incident from the rear substrate 53 to the liquid crystal 78 while reflecting circular-polarized light of other wavelength bands (e.g., green and blue visible lights). The CLC polarizer 71 plays a role of transmitting only circular-polarized light of a specific direction in light input from the backlight unit 92.

In the case of displaying a picture in the transmission mode, only circular-polarized light of a specific direction from the backlight unit 92 that is incident the CLC polarizer 71 is transmitted through the CLC polarizer to be incident the second CLC color filter 73. Only visible light of a specific visible light wavelength band in the circular-polarized light that is incident the second CLC color filter 73 is transmitted to the liquid crystal 78. At this time, if a voltage is not applied to the liquid crystal 78 as shown in FIG. 7a, then the circular-polarized light passing through the second CLC color filter 73 is incident, via the front substrate 79, to the first λ/4 plate 80 while maintaining its polarization characteristic. The circular-polarized light that is incident to the first λ/4 plate 80 is converted into linear-polarized light in a direction identical to a light axis of the linear polarizer 81 and then passes through the linear polarizer 81 to emerge on the display screen.

In the case of displaying a picture in the reflection mode, linear-polarized light passing through the linear polarizer 81 that is incident the first λ/4 plate 80 is converted into circular-polarized light having a specific direction by means of the first λ/4 plate 80. This circular-polarized light is incident, via the liquid crystal 78, the first CLC color filter 77 while maintaining its polarization characteristic. Only a specific visible light wavelength band (e.g., a red visible light) of the circular-polarized light that is incident the first CLC color filter 77 is reflected from the first CLC color filter 77 into the liquid crystal 78, whereas other wavelength bands (e.g., green and blue visible lights) are absorbed by the light-absorbing layer 76, and thus become extinct. The left circular-polarized light of a specific visible light band reflected by the first CLC color filter 77 is again incident, via the liquid crystal 78 and the front substrate 79, the first λ/4 plate 80. The reflective light that is incident the first λ/4 plate 80 is converted into linear-polarized light in a direction identical to a light axis of the linear polarizer 81 and then passes through the linear polarizer 81 to emerge on the display screen.

If a voltage is applied to the liquid crystal 78, then external light and light generated from the backlight unit 92 make a phase change of 180°. This phase shifted external and internal light have a polarization characteristic in which their light axes are different from a light axis of the linear polarizer 81. Consequently, a non-display state results when the phase shifted external and internal light is incident the linear polarizer 81.

Figure 9:
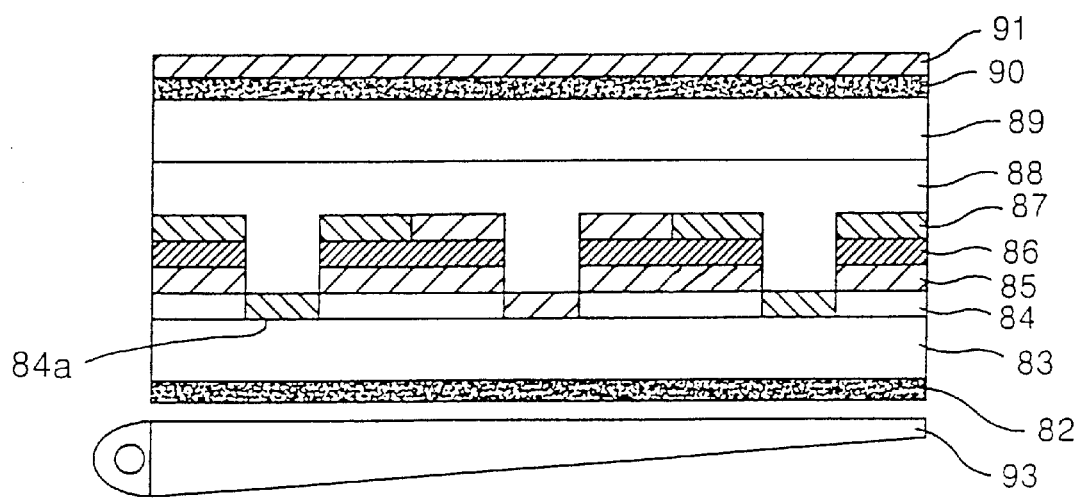
FIG. 9 is a section view showing an exemplary structure of a transparent reflective liquid crystal display according to a eighth embodiment of the present invention.

Referring to FIG. 9, there is shown a transparent reflective LCD according to an eighth embodiment of the present invention.

The transparent reflective LCD includes a front substrate 89 and a rear substrate 83 between which a liquid crystal 88 is injected. A first λ/4 plate 90 and a linear polarizer 91 are provided on the front side of the front substrate 89. A first CLC color filter 87, a light-absorbing layer 86, a metal reflecting plate 85 and a second λ/4 plate 84 are provided between the liquid crystal 98 and the rear substrate 83. A second CLC color filter 84a is formed on the second λ/4 plate 84, and a CLC polarizer 82 is provided on the rear side of the rear substrate 83. An alignment layer (not shown) is formed on the front substrate 89 and the rear substrate 83 and is used for setting up a pre-tilt angle. A common electrode (not shown) is formed between the alignment layer and the rear side of the front substrate 89, and a pixel electrode (not shown) is formed between the alignment layer and the front side of the rear substrate 83.

The linear polarizer 91 converts an external light into a specific linear-polarized light. The first λ/4 plate 90 converts the linear-polarized light from the linear polarizer 91 into circular-polarized light, and also converts circular-polarized light being incident via the front substrate 89 into linear-polarized light. The first CLC color filter 87, the light-absorbing layer 86 and the metal reflecting plate 85 are provided with holes passing through them. The second CLC color filter 84a is formed at the second λ/4 plate 84 in substantial alignment with these holes.

The first CLC color filter 87 reflects light of a specific visible light wavelength band in circular-polarized light that is incident from the liquid crystal 88 while transmitting light of other wavelength bands to the light-absorbing layer 86. The light-absorbing layer 86 plays a role of absorbing light input from the first CLC color filter 87. The metal reflecting plate 85 transmits a light input from the second CLC color filter 84a to the liquid crystal 88 via the holes. The second CLC color filter 84a transmits circular-polarized light having a specific visible wavelength band (e.g., a red visible light) that is incident from the rear substrate 83 to the liquid crystal 88 while reflecting circular-polarized light of other wavelength bands (e.g., green and blue visible lights). The CLC polarizer 82 plays a role of transmitting only circular-polarized light having a specific direction in light input from the backlight unit 93.

In the case of displaying a picture in the transmission mode, only circular-polarized light having a specific direction of light that is incident the CLC polarizer 82 from the backlight unit 93 is transmitted through the CLC polarizer 82 to be incident to second CLC color filter 84a. Only a visible light of a specific visible light wavelength band in the circular-polarized light that is incident the second CLC color filter 84a is transmitted to the liquid crystal 88. At this time, if a voltage is not applied to the liquid crystal 88, then the circular-polarized light passing through the second CLC color filter 84a is incident, via the front substrate 89, to the first λ/4 plate 90 while maintaining its polarization characteristic. The circular-polarized light being incident to the first λ/4 plate 80 is converted into linear-polarized light in a direction identical to a light axis of the linear polarizer 91 and then passes through the linear polarizer 91 to emerge on the display screen.

In the case of displaying a picture in the reflection mode, linear-polarized light passing through the linear polarizer 91 and incident the first λ/4 plate 90 is converted into circular-polarized light having a specific direction by the first λ/4 plate 90. This circular-polarized light is incident, via the liquid crystal 88, to the first CLC color filter 87 while maintaining its polarization characteristic. Only a specific visible light wavelength band (e.g., a red visible light) of the circular-polarized light that is incident the first CLC color filter 87 is reflected from the first CLC color filter 87 into the liquid crystal 88, whereas other wavelength bands (e.g., green and blue visible lights) are absorbed by the light-absorbing layer 86 and become extinct. The circular-polarized light with a specific visible light band reflected by the first CLC color filter 87 is again incident, via the liquid crystal 88 and the front substrate 89, the first λ/4 plate 90. The reflective light that is incident to first λ/4 plate 90 is converted into a linear-polarized light in a direction identical to a light axis of the linear polarizer 91 and then passes through the linear polarizer 91 to emerge on the display screen.

If a voltage is applied to the liquid crystal 88, then external light and light generated from the backlight unit 93 make a phase change of 180°. The phase-shifted external and internal light have a polarization characteristic in which their light axes are different from a light axis of the linear polarizer 91. Consequently, a non-display state results when the phase shifted external and internal light is incident the linear polarizer 91.

Figure 10:
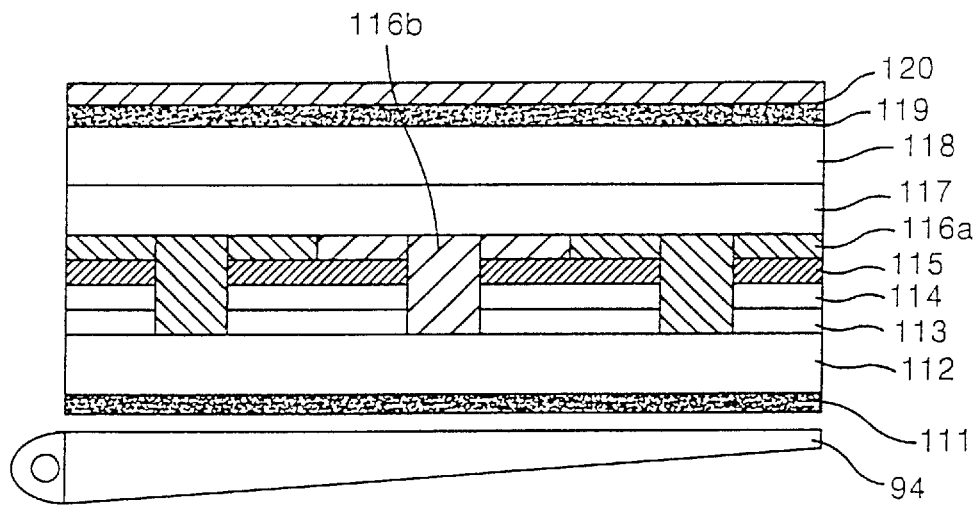
FIG. 10 is a section view showing a structure of an exemplary transparent reflective liquid crystal display according to a ninth embodiment of the present invention.

Referring to FIG. 10, there is shown a transparent reflective LCD according to a ninth embodiment of the present invention.

The transparent reflective LCD includes a front substrate 118 and a rear substrate 112 between which a liquid crystal 117 is injected. A first λ/4 plate 119 and a linear polarizer 120 are provided on the front side of the front substrate 118. A single-layer CLC color filter 116a, a light-absorbing layer 115, a metal reflecting plate 114 and a second λ/4 plate 113 are provided between the liquid crystal 117 and the rear substrate 112. A double-layer CLC color filter 116b is formed at holes passing through the light-absorbing layer 115, and the metal reflecting plate 114 and the second λ/4 plate 113. A CLC polarizer 111 is attached onto the rear side of the rear substrate 112. An alignment layer (not shown) is provided on the front substrate 118 and the rear substrate 112 and is used for setting up a pre-tilt angle. A common electrode (not shown) is formed between the alignment layer and the rear side of the front substrate 118, and a pixel electrode (not shown) is formed between the alignment layer and the front side of the rear substrate 112.

The linear polarizer 120 converts an external light into a specific linear-polarized light. The first λ/4 plate 119 converts the linear-polarized light from the linear polarizer 120 into a circular-polarized light and also converts a circular-polarized light that is incident from the front substrate 118 into linear-polarized light. The single-layer CLC color filter 116a reflects light of a specific visible light wavelength band in circular-polarized light that is incident from the liquid crystal 117 while transmitting a light of other wavelength bands to the light-absorbing layer 115. The light-absorbing layer 115 plays a role of absorbing light input from the single-layer CLC color filter 116a. The metal reflecting plate 114 transmits a light input from the double-layer CLC color filter 116b to the liquid crystal 117 via the holes. The double-layer CLC color filter 116b transmits circular-polarized light having a specific visible wavelength band (e.g., a red visible light) that is incident from the rear substrate 112 to the liquid crystal 117 while reflecting circular-polarized light of other wavelength bands (e.g., green and blue visible lights). The CLC polarizer 111 plays a role of transmitting only circular-polarized light having a specific direction in a light input from the backlight unit 94.

In the case of displaying a picture in the transmission mode, only circular-polarized light having a specific direction of light that is incident to CLC polarizer 111 from the backlight unit 94 is transmitted to be incident the double-layer CLC color filter 116b. Only visible light of a specific visible light wavelength band in the circular-polarized light being incident the double-layer CLC color filter 116b is transmitted to the liquid crystal 117. At this time, if a voltage is not applied to the liquid crystal 117, then the circular-polarized light passing through the double-layer CLC color filter 116b is incident, via the front substrate 118, the first λ/4 plate 119 while maintaining its polarization characteristic. The circular-polarized light that is incident the first λ/4 plate 119 is converted into linear-polarized light in a direction identical to a light axis of the linear polarizer 120 and then passes through the linear polarizer 120 to emerge on the display screen.

In the case of displaying a picture in the reflection mode, linear-polarized light passing through the linear polarizer 120 that is incident the first λ/4 plate 119 is converted into circular-polarized light having a specific direction by the first λ/4 plate 119. This circular-polarized light is incident, via the liquid crystal 117, the single-layer CLC color filter 116a while maintaining its polarization characteristic. Only a specific visible light wavelength band (e.g., a red visible light) of the circular-polarized light that is incident the single-layer CLC color filter 116a is reflected from the single-layer CLC color filter 116a into the liquid crystal 117, whereas other wavelength bands (e.g., green and blue visible lights) are absorbed by the light-absorbing layer 115 and become extinct. The circular-polarized light with a specific visible light band reflected by the single-layer CLC color filter 116a is again incident, via the liquid crystal 117 and the front substrate 118, to the first λ/4 plate 119. The reflective light that is incident the first λ/4 plate 119 is converted into linear-polarized light in a direction identical to a light axis of the linear polarizer 120 and then passes through the linear polarizer 120 to emerge on the display screen.

If a voltage is applied to the liquid crystal 117, then external light and light generated from the backlight unit 94 make a phase change of 180°. This phase shifted external and internal light have a polarization characteristic in which their light axes are different from a light axis of the linear polarizer 120. Consequently, a non-display state results when the phase shifted external and internal light is incident the linear polarizer 120.

Figure 11:
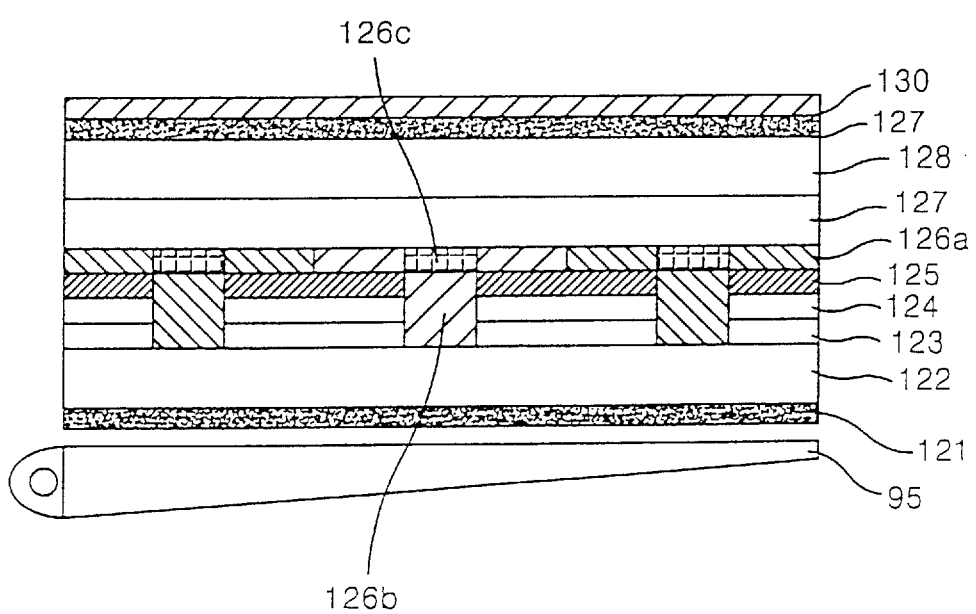
FIG. 11 is a section view showing a structure of an exemplary transparent reflective liquid crystal display according to a tenth embodiment of the present invention.

Referring to FIG. 11, there is shown a transparent reflective LCD according to a tenth embodiment of the present invention.

The transparent reflective LCD includes a front substrate 128 and a rear substrate 122 between which a liquid crystal 127 is injected. A first λ/4 plate 129 and a linear polarizer 130 is provided on the front side of the front substrate 128. A single-layer CLC color filter 126a, a light-absorbing layer 125, a metal reflecting plate 124 and a second λ/4 plate 123 are provided between the liquid crystal 127 and the rear substrate 122. A double-layer CLC color filter 126b is formed at holes passing through the light-absorbing layer 125, the metal reflecting plate 124, and the second λ/4 plate 123. An absorptive color filter 126c is provided on the single-layer CLC color filter 126a in substantial alignment with the double-layer CLC color filter 126b, and a CLC polarizer 121 is attached onto the rear side of the rear substrate 122. An alignment layer (not shown) is provided on the front substrate 128 and the rear substrate 122 and is used for setting up a pre-tilt angle. A common electrode (not shown) is formed between the alignment layer and the rear side of the front substrate 128, and a pixel electrode (not shown) is formed between the alignment layer and the front side of the rear substrate 122.

The linear polarizer 130 converts external light into a specific linear-polarized light. The first λ/4 plate 129 converts the linear-polarized light from the linear polarizer 130 into circular-polarized light and also converts circular-polarized light that is incident from the front substrate 128 into linear-polarized light. The single-layer CLC color filter 126a reflects light with a specific visible light wavelength band in circular-polarized light that is incident from the liquid crystal 127 while transmitting light of other wavelength bands to the light-absorbing layer 125. The light-absorbing layer 125 plays a role of absorbing light input from the single-layer CLC color filter 126a. The metal reflecting plate 124 transmits light input from the double-layer CLC color filter 126b to the liquid crystal 127 via the holes. The double-layer CLC color filter 126b transmits circular-polarized light of a specific visible wavelength band (e.g., a red visible light) that is incident from the rear substrate 122 to the liquid crystal 127 while reflecting circular-polarized light of other wavelength bands (e.g., green and blue visible lights). The absorptive color filter 126c transmits only light of a specific wavelength band in light input from the double-layer CLC color filter 126b while absorbing and extinguishing a light with other wavelength bands, thereby improving a color purity of the light input from the double-layer CLC color filter 126b. The CLC polarizer 121 plays a role to transmit only circular-polarized light having a specific direction in light input from the backlight unit 95.

In the case of displaying a picture in the transmission mode, only circular-polarized light of light being incident to the CLC polarizer 121 from the backlight unit 95 having a specific direction is transmitted through the CLC polarizer 121 and then made incident the double-layer CLC color filter 126b. Then, only visible light of a specific visible light wavelength band in the circular-polarized light being incident to the double-layer CLC color filter 126b is transmitted, via the absorptive color filter 126c, to the liquid crystal 127. At this time, if a voltage is not applied to the liquid crystal 127, then light passing through the absorptive color filter 126c is incident, via the front substrate 128, to the first λ/4 plate 129 while maintaining its polarization characteristic. The circular-polarized light being incident to the first λ/4 plate 129 is converted into linear-polarized light in a direction identical to a light axis of the linear polarizer 130 and then passes through the linear polarizer 130 to emerge on the display screen.

In the case of displaying a picture in the reflection mode, a linear-polarized light passing through the linear polarizer 130 and incident the first λ/4 plate 129 is converted into circular-polarized light having a specific direction by the first λ/4 plate 129. This circular-polarized light is incident, via the liquid crystal 127, the single-layer CLC color filter 126a while maintaining its polarization characteristic. Only a specific visible light wavelength band (e.g., a red visible light) of the circular-polarized light that is incident the single-layer CLC color filter 126a is reflected from the single-layer CLC color filter 126a into the liquid crystal 127, whereas other wavelength bands (e.g., green and blue visible lights) are absorbed by the light-absorbing layer 125 and become extinct. The circular-polarized light of a specific visible light band reflected by the single-layer CLC color filter 126a is again incident, via the liquid crystal 127 and the front substrate 128, the first λ/4 plate 129. The reflective light that is incident the first λ/4 plate 129 is converted into linear-polarized light in a direction identical to a light axis of the linear polarizer 130 and then passes through the linear polarizer 130 to emerge on the display screen.

If a voltage is applied to the liquid crystal 127, then external light and light generated from the backlight unit 95 make a phase change of 180°. This phase shifted external and internal light have a polarization characteristic in which their light axes are different from a light axis of the linear polarizer 130. Consequently, a non-display state results when the phase shifted external and internal light is incident the linear polarizer 130.

As described in the foregoing exemplary embodiments, the present invention improves light efficiency in the transmission mode or the reflection mode of an LCD device by utilizing two CLC polarizers that reflect circular-polarized light having different directions. Furthermore, the present invention also improves color purity of an LCD by providing and LCD with an absorptive color filter and a CLC color filter.

It will be apparent to those skilled in the art that various modifications and variations can be made for the transparent reflective liquid crystal display of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A transparent reflective liquid crystal display device using light generated from external light sources and a backlight unit, the device comprising:

a first circular polarizer for transmitting circular-polarized light having a first direction input from the backlight unit while reflecting a circular-polarized light having a second direction contrary to the first direction;

a second circular polarizer for transmitting the circular-polarized light having the second direction while reflecting the circular-polarized light having the first direction;

a first circular-polarizing color filter, being provided at least partly within the second circular polarizer, for extracting circular-polarized light of a specific visible light wavelength band in the circular-polarized light having the first direction; and a reflecting member arranged at one side of the second circular polarizer to reflect the external light and having at least one hole formed therein in substantial alignment with the first circular-polarizing color filter to transmit the circular-polarized light of the specific visible light wavelength band via the at least one hole.

2. The transparent reflective liquid crystal display device according to claim 1, further comprising:

a linear polarizer for transmitting a linear-polarized light having a specific direction in the external light;

a λ/4 plate for converting the linear-polarized light into circular-polarized light;

a front substrate on which the λ/4 plate and the linear polarizer are disposed;

a rear substrate to the rear and front of which the first and second circular polarizers are respectively attached; and a liquid crystal injected between the front substrate and the rear substrate, wherein the reflecting member is disposed between the liquid crystal and the second circular polarizer.

3. The transparent reflective liquid crystal display device according to claim 2, further comprising transparent electrodes formed on the rear side of the front substrate and the front side of the rear substrate, respectively.

4. The transparent reflective liquid crystal display device according to claim 1, wherein the circular polarizers are cholesteric liquid crystal (CLC) polarizers, and the first circular-polarizing color filter is a CLC color filter.

5. The transparent reflective liquid crystal display device according to claim 1, wherein the reflecting member is made from a metal.

6. The transparent reflective liquid crystal display device according to claim 1, wherein the reflecting member includes:

a second circular-polarizing color filter for reflecting circular-polarized light of a specific visible light wavelength band in circular-polarized components of the external light while transmitting circular-polarized light of other wavelength bands; and a light-absorbing member, being arranged at one side of the second circular-polarizing color filter, for absorbing a light input from the second circular-polarizing color filter.

7. The transparent reflective liquid crystal display device according to claim 6, wherein the at least one hole is defined in the second circular-polarizing color filter, the light-absorbing member and the second circular polarizer, and the first circular-polarizing color filter, is formed in the at least one hole for transmitting circular-polarized light having a specific visible light wavelength band in the circular-polarized light input from the first circular polarizer.

8. The transparent reflective liquid crystal display device according to claim 6, wherein the at least one hole is defined in the second circular-polarizing color filter, the light-absorbing member and the second circular polarizer, and the first circular-polarizing color filter is formed in the at least one hole defined in the light-absorbing member and the second circular polarizer for transmitting a circular-polarized light having a specific visible light wavelength band in the circular-polarized light input from the first circular polarizer; and wherein the transparent reflective liquid crystal display device further comprises an absorptive color filter that is formed in the at least one hole defined in the second circular-polarizing color filter and substantially aligned to the first circular-polarizing color filter for extracting a light having a specific visible light wavelength band in the circular-polarized light input from the first circular-polarizing color filter while absorbing a light having other wavelength bands.

9. A transparent reflective liquid crystal display device using light generated from external light sources and a backlight unit, the device comprising:

a circular polarizer for transmitting circular-polarized light having a first direction input from the backlight unit while reflecting circular-polarized light having a second direction contrary to the first direction;

a first λ/4 plate, being arranged in front of the circular polarizer, for converting circular-polarized light input from the circular polarizer into linear-polarized light having a specific direction;

first circular-polarizing color filter for reflecting circular-polarized light of a specific visible light wavelength band in circular-polarized light of the external light;

a light-absorbing member, being provided at the rear side of the first circular-polarizing color filter, for absorbing light from the first circular-polarizing color filter;

a reflecting member, being provided between the first λ/4 plate and the light-absorbing member, for reflecting the light;

at least one hole passing through each of the first circular-polarizing color filter, the light-absorbing member, the reflecting member and the first λ/4 plate to assure a light path; and a second circular-polarizing color filter for transmitting circular-polarized light of a specific visible light band in the circular-polarized light input from the circular polarizer via the at least one hole.

10. The transparent reflective liquid crystal display device according to claim 9, further comprising:

a linear polarizer for transmitting linear-polarized light having a specific direction in the external light;

a second λ/4 plate for converting the linear-polarized light into a circular-polarized light;

a front substrate on which the second λ/4 plate and the linear polarizer are provided;

a rear substrate, wherein the circular polarizer is provided at the rear of the rear substrate, and the first λ/4 plate, the reflecting member, the light-absorbing member and the first circular-polarizing color filter are provided at the front of the rear substrate; and a liquid crystal between the front substrate and the first circular-polarizing color filter.

11. The transparent reflective liquid crystal display device according to claim 10, further comprising transparent electrodes formed on the rear side of the front substrate and the front side of the rear substrate, respectively.

12. The transparent reflective liquid crystal display device according to claim 10, wherein the second circular-polarizing color filter is arranged between the rear substrate and the first λ/4 plate.

13. The transparent reflective liquid crystal display device according to claim 9, wherein the second circular-polarizing color filter is formed in the at least one hole.

14. The transparent reflective liquid crystal display device according to claim 9, wherein the second circular-polarizing color filter is arranged within the first λ/4 plate in such a manner to be substantially aligned with the at least one hole.

15. The transparent reflective liquid crystal display device according to claim 9, wherein the second circular-polarizing color filter is formed in the at least one hole defined in the light-absorbing member, the reflecting member and the first $\lambda/4$ plate, and wherein the transparent reflective liquid crystal display device further comprises an absorptive color filter that is formed in the at least one hole defined in the first circular-polarizing color filter and substantially aligned with the second circular-polarizing color filter for extracting a light of a specific visible light wavelength band in the circular-polarized light input from the second circular-polarizing color filter while absorbing a light of other wavelength bands.

* * * * *